United States Patent [19]

Einarsson

[11] 4,366,639

[45] Jan. 4, 1983

[54] SHAKING MACHINE FOR FISHING NETS

[75] Inventor: Guobjartur Einarsson, Hafnarfiroi, Iceland

[73] Assignee: Veltak, Ltd., Hafnarfirdi, Iceland

[21] Appl. No.: 200,911

[22] Filed: Oct. 27, 1980

[30] Foreign Application Priority Data

Oct. 20, 1978 [GB] United Kingdom ............... 41318/78

[51] Int. Cl.³ .......................................... A01K 69/02
[52] U.S. Cl. ...................................................... 43/8
[58] Field of Search .............. 43/8; 414/140; 114/255; 366/108, 109; 254/264

[56] References Cited

U.S. PATENT DOCUMENTS

| 3,047,973 | 8/1962 | Puretic | 43/8 |
| 3,707,799 | 1/1973 | Hatley | 43/8 |
| 4,204,354 | 5/1980 | Kane | 43/8 |

FOREIGN PATENT DOCUMENTS

| 117815 | 6/1958 | U.S.S.R. | 43/8 |
| 153808 | 6/1962 | U.S.S.R. | 43/8 |
| 175346 | 7/1964 | U.S.S.R. | 43/8 |
| 199557 | 10/1965 | U.S.S.R. | 43/8 |
| 185624 | 10/1966 | U.S.S.R. | 43/8 |
| 188792 | 9/1967 | U.S.S.R. | 43/8 |

Primary Examiner—Nicholas P. Godici
Assistant Examiner—M. Jordan

[57] ABSTRACT

A shaking machine for shaking fish out of drift nets includes a shaking fence at the forward end thereof for receiving a drift net to be shaken, the shaking fence being reciprocally driven so as to shake a drift net received thereon. An upper drum is rotatably mounted in the machine and is located above the shaking fence and a lower drum is rotatably mounted in the machine and is located below the shaking fence. In one embodiment, the upper and lower drums are rotatably driven in different rotational directions to propel a drift net received over the upper drum and under the lower drum through the machine, to the rear end of the machine. In another embodiment, the upper drum is driven and the lower drum is freely rotatable so that nets wound around the upper drum are pulled thereby, and are then passed under the lower drum for laying out on, for example, the deck of a boat.

19 Claims, 9 Drawing Figures

SHAKING MACHINE FOR FISHING NETS

The invention relates to a shaking machine for fishing nets, and more particularly to drifting nets for use in fishing for herring and other small fish.

It is well known in herring fishing with drifting nets that the catch must be shaken out of the nets just as they come onboard the fishing vessel. Right from the beginning of fishing with drift nets, which were originally made of hemp, there was no other way of cleaning them than shaking them by hand. As use of much stronger and more durable nylon nets began, it was noticed that cleaning the catch out of these nets was much harder and took more time than for hemp nets. This fact led to the idea of machine cleaning the nets to ease the work and shorten the cleaning time.

The object of the present invention is to provide a shaking machine for drift nets which is efficient and safe in operation.

SUMMARY OF THE INVENTION

In accordance with the present invention, a shaking machine for shaking fish, such as herring and other small fish, out of drift nets comprising at least first and second spaced apart housing members, a shaking fence mounted between the housing members for receiving a drift net to be shaken, the shaking fence being at the forward end of the shaking machine; and drive means coupled to the shaking fence for reciprocally moving the shaking fence relative to the housing members. The shaking machine further comprises an upper rotatably driven drum rotatably coupled to the housing members and located above the shaking fence, the upper drum receiving the drift net from the shaking fence over the upper drum and pulling the net.

In one preferred arrangement, a lower drum is rotatably coupled to the housing members and located below the upper drum, the lower drum receiving the drift net from the upper drum, the drift net being passed under the second drum. The upper and lower drums are driven in different rotational directions to propel a drift net received by the drums from the shaking fence at the forward end of the machine to the rear end of the shaking machine.

In another preferred arrangement, a freely rotatable lower drum is provided, under which the net is passed, to permit the net pulled by the upper drum to be laid out on a boat.

In accordance with a preferred embodiment, the shaking fence is pivotally mounted to the housing members and the first drive means reciprocally pivots the shaking fence relative to the housing members. Still further, in a preferred embodiment having the pivotable shaking fence, the shaking fence comprises a pair of spaced apart elongated members (such as wire-ropes or the like) mounted at the forward end thereof and extending between respective pivotally mounted arms, and at least one elongated member (such a wire-rope or the like) mounted at the rearward end of the shaking fence and extending between the arms, the drift net being passed through the pair of spaced apart elongated members and over the at least one elongated member which is located at the rearward end of the shaking fence.

Other objects and features of the invention will become apparent from the following detailed description taken in conjunction with the appended drawings.

BRIEF DESCRIPTION OF THE DRAWINGS

FIG. 3 is an end view, partly sectioned, looking at the machine where it takes the nets in;

DETAILED DESCRIPTION

The shaking machine comprises two end housings 1a, 1b holding rotatable drums 2, 3 and a shaking fence 4 in position. The whole driving mechanism is installed in housing 1b. In housing 1a there are only mounted the necessary bearings for the axles of the drums 2, 3 and the shaking fence 4.

Figure 1:
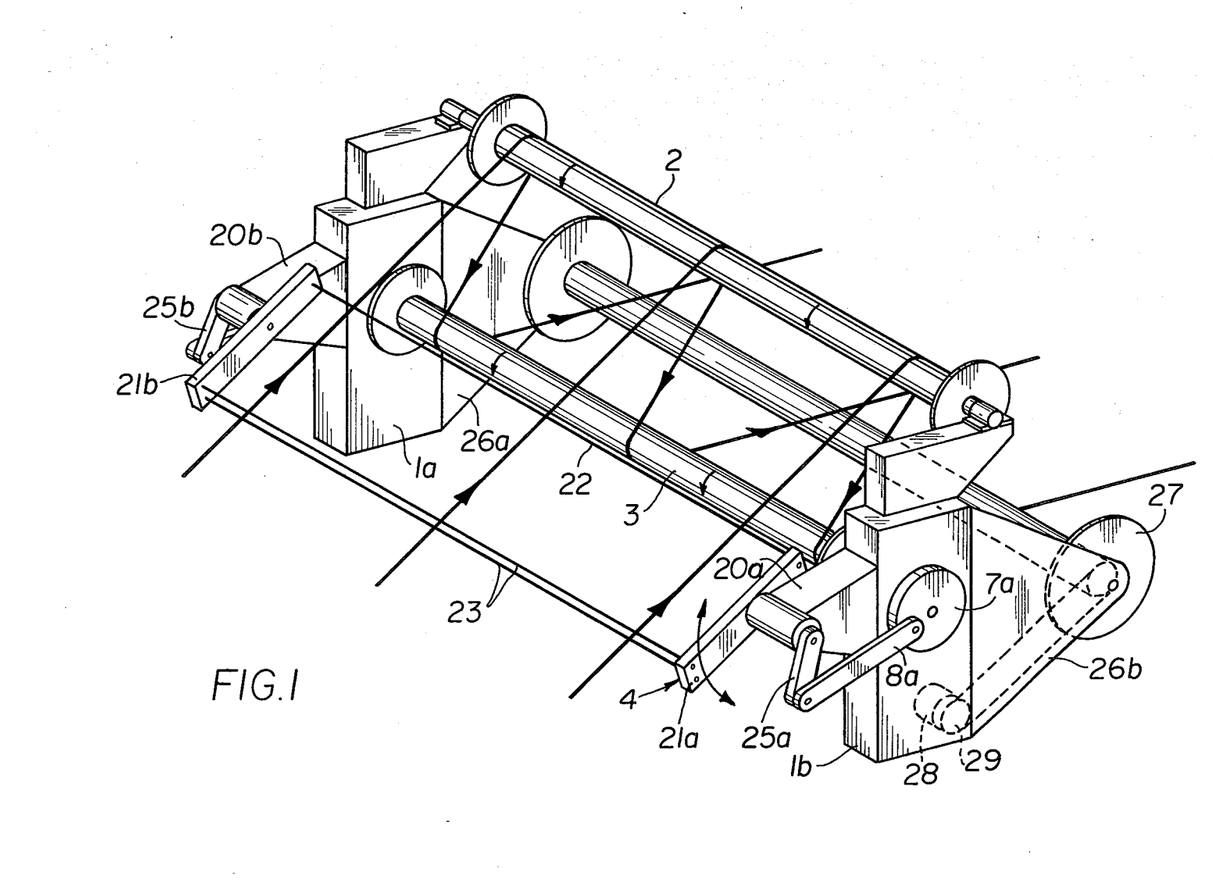
FIG. 1 is a top perspective line drawing of the shaking machine of the present invention.
Figure 2:
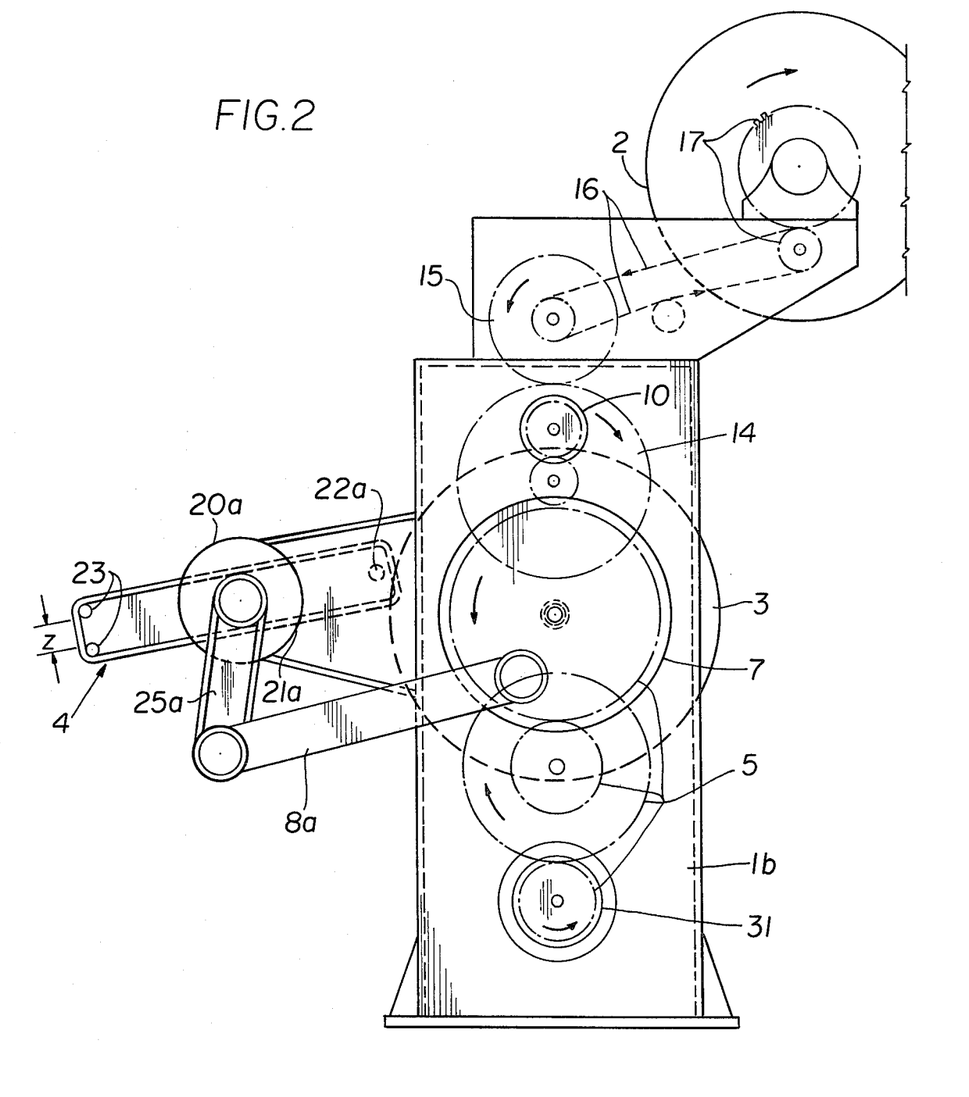
FIG. 2 is a side view, partly sectioned, as seen from the motor side.
Figure 3:
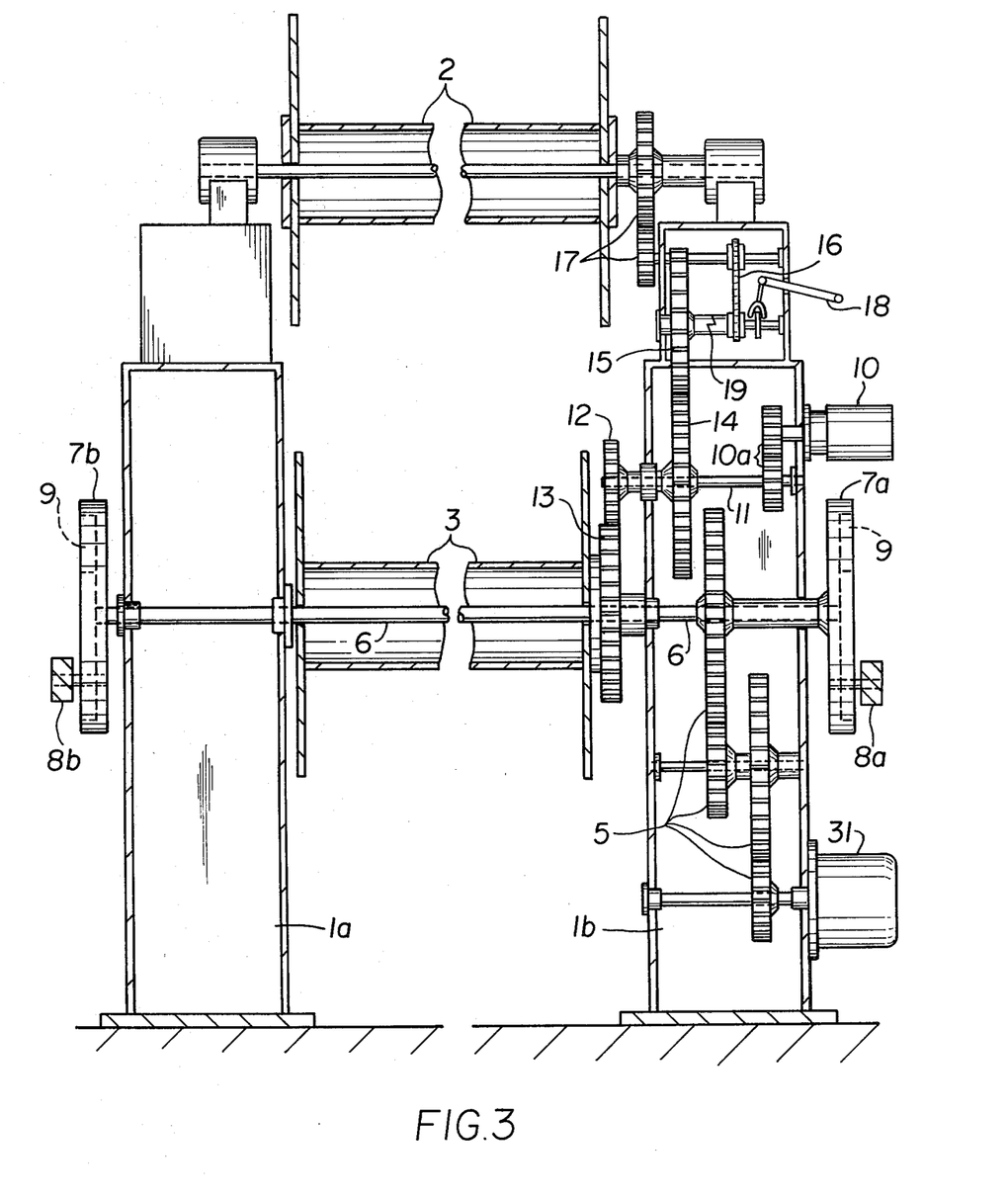

As seen in FIGS. 2 and 3, the driving power comes from a motor 31, in this case a hydraulic motor, working at high speed, and is geared down by a gear drive 5 to the proper RPM for the main drive shaft 6. The drive shaft 6 is fully floating through the drum 3. Flywheels 7a and 7b are mounted at the respective ends of drive shaft 6. Shaking arms 8a, 8b are connected to respective flywheels 7a, 7b eccentrically, and are further coupled to the shaking fence 4 (see FIGS. 1 and 2) to shake the shaking fence 4 by their motion back and forth. Flywheels 7a, 7b are shaped so that opposite to the mounting of the shaking arms 8a, 8b there are additional balance masses 9 to balance the extra weight of the shaking arms 8 for smoother running and preventing unnecessary vibration.

The drums 2, 3 are driven by a separate hydraulic motor 10 (FIG. 3) which drives the shaft 11 via gearwheels 10a. This allows a good control of the drum speed independent of shaking frequency. The gearwheel 12 on the shaft 11 drives gearwheel 13 and thereby turns the lower drum 3. The gearwheel 14 on shaft 11 drives gearwheel 15 and at the same time drives the chaindrive 16, which in turn drives the upper drum 2 over gearwheelset 17. The upper drum 2 can be stopped by moving the operation arm 18 upward, thereby disconnecting the coupling 19 between gearwheel 15 and chaindrive 16.

Figure 4:
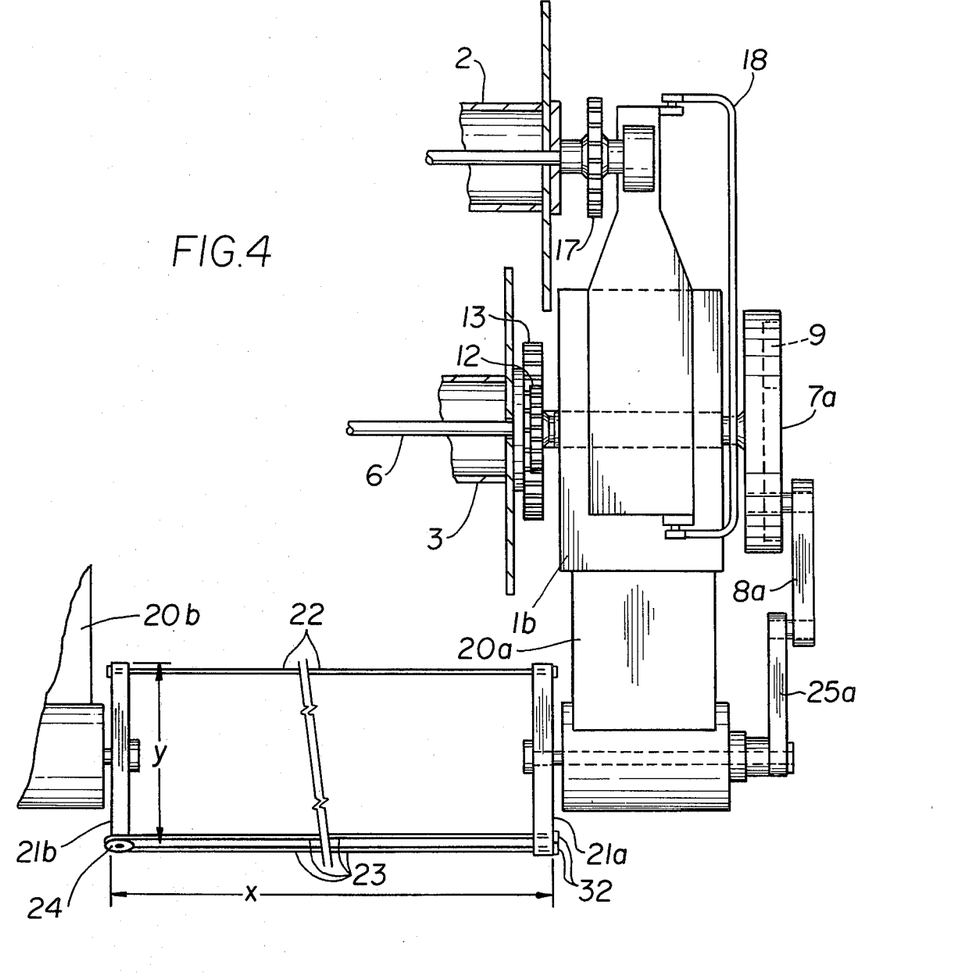
FIG. 4 is a top view, partly sectioned.

As seen in FIG. 1, the shaking fence 4 is mounted with bearings in the bearing housings 20a, 20b. The shaking fence 4 comprises end arms 21a, 21b, a single wire-rope 22 at the back and a double wire-rope 23 at the front of the fence. These wire-ropes are preferably coated with a plastic hose to prevent damaging the nets. The double wire-rope 23 lies over a roller 24 (FIG. 4) on the arm 21b and is fastened and tightened with screwnuts 32 on arm 21a. The shaking arms 8a, 8b move the arms 25a, 25b back and forth as the driveshaft 6 turns and thereby swings the shaking fence 4.

Figure 5:
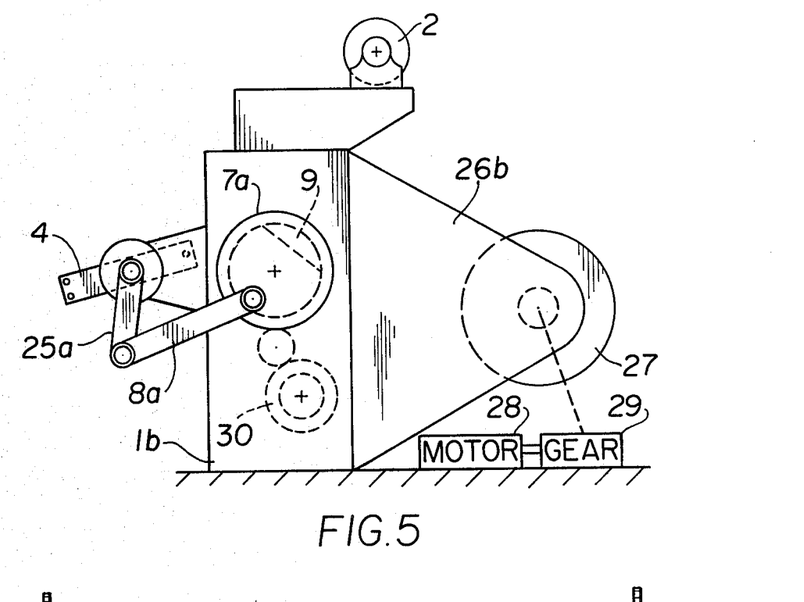
FIG. 5 illustrates the shaking machine as seen from a side with a net-drum mounted thereon.
Figure 6:
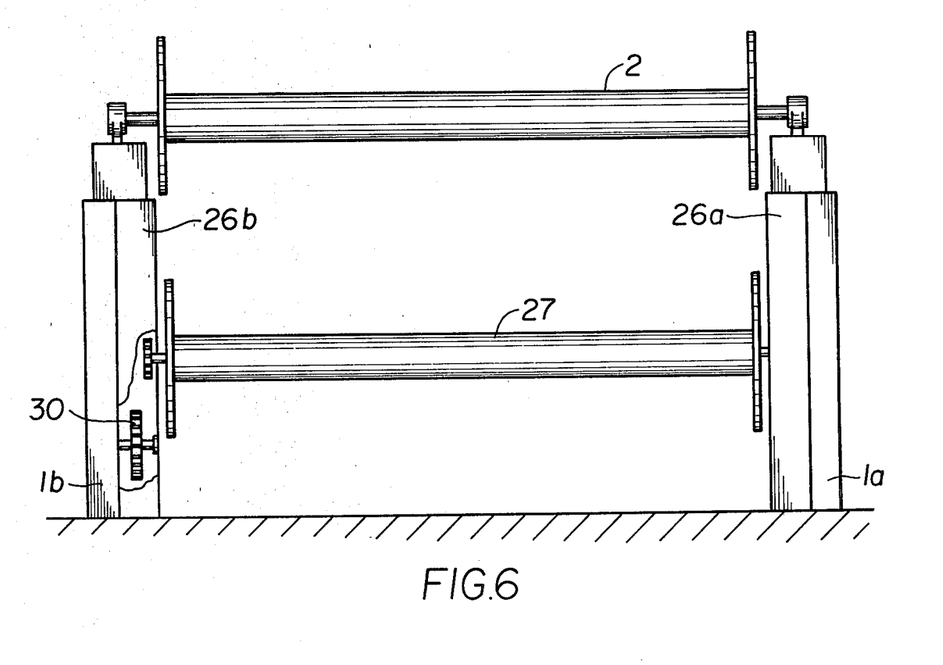
FIG. 6 is an end view looking at the machine where the nets come out.

As seen in FIGS. 1 and 5, at the rear end of the shaking machine, where the nets come out of it, there are mounted to rearwardly extending housings 26a, 26b for bearings to hold the net drum 27 in place. The net drum 27 is driven by a motor 28 via a variable gear arrangement 29 so that the drum 27 can be run at any speed for holding the pulling speed of the nets constant to compensate for increased diameter of the nets on drum 27. The speed of pulling by drum 27 can be set independent of the shaking frequency. The motor 28 and gear 29 can be replaced by a suitable variable speed hydraulic motor drive. The drift nets are wound up on the net drum 27 after the catch has been shaken out of them.

OPERATION OF EMBODIMENT OF FIGS. 1–6

As indicated by the heavy arrowed lines in FIG. 1, the drift nets are pulled onboard the fishing vessel through the double wire-rope 23 (i.e., between the wire-ropes 23), over the wire-rope 22, over the upper drum 2, under the lower drum 3 and from there are wound up on the net drum 27. The shaking of the catch out of the nets takes place on the way from the double wire-rope 23 to the upper drum 2. The pulling speed of the machine can easily be varied by varying the oil flow through the hydraulic motor 10, which drives the drums 2,3. Furthermore, the pulling of the nets can be stopped by disconnecting the drum 2 by operating operation arm 18 to uncouple the coupling 19 as explained above, during which time the drum 3 continues to turn and hold the nets tight to prevent them from slipping out of the vessel. Even during the time the roller 2 is stopped, the shaking of the nets can still go on by means of independently driven shaking fence 4.

EXAMPLE (FIGS. 1–6)

In an embodiment of the invention useful for shaking small fish, such as herring, out of nets, the apparatus is as follows:
- diameter of drums 2, 3 = 190 mm
- length of drums 2, 3 = 2:4 m; 3:3,8 m
- typical speed of rotation of drums 2, 3 = 60 rpm
- typical speed of rotation of net drum 27 = 40–80 rpm
- length x (FIG. 4) of shaking fence = 4 m
- width y (FIG. 4) of shaking fence = 550 mm
- spacing z (FIG. 2) between wire ropes 23 = 165 mm
- typical time period for one cycle of oscillation of shaking fence = 320 cycles per minute.

Figures 7, 8:
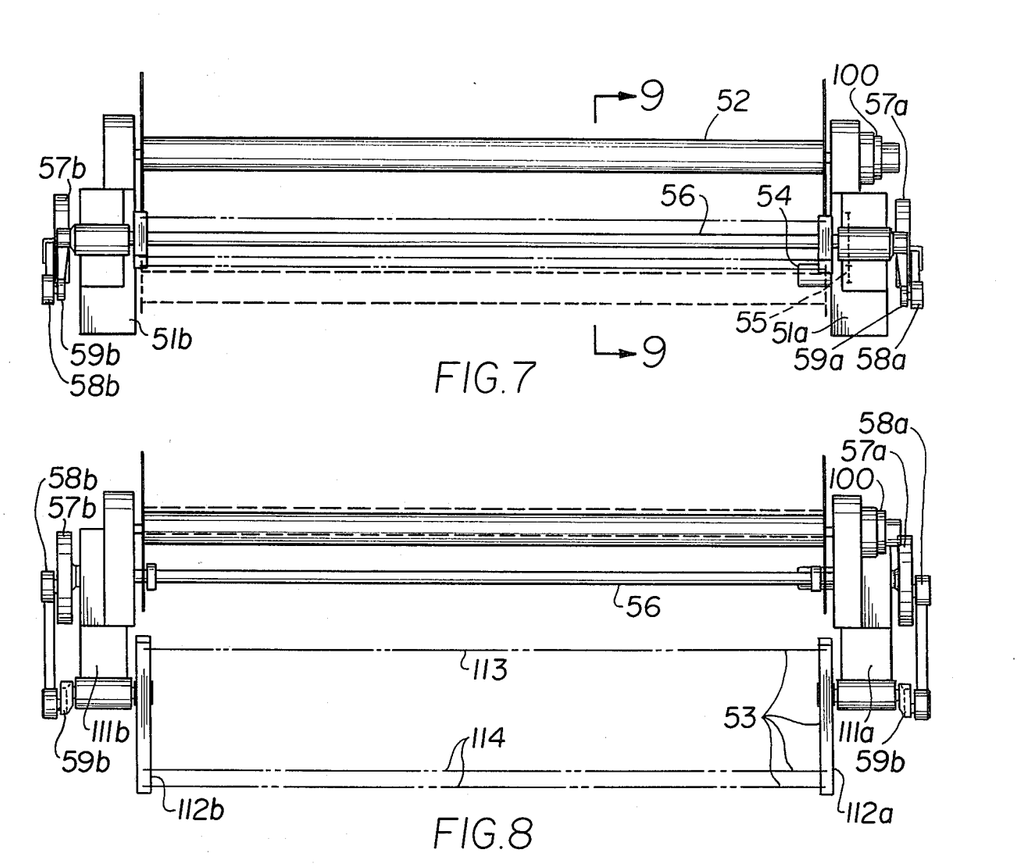
FIG. 7 is a front view of a further simplified embodiment of the invention.
FIG. 8 is a top view of the embodiment of FIG. 7.
Figure 9:
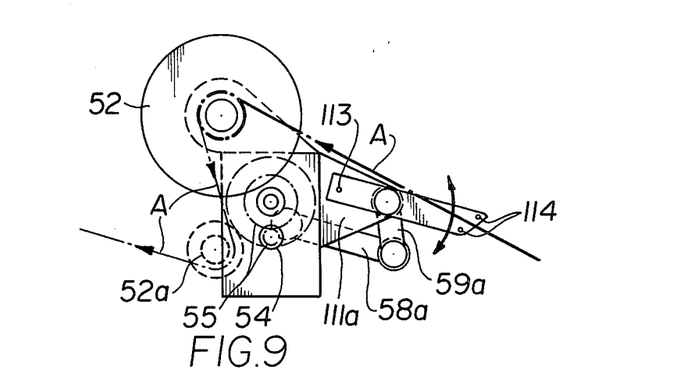
FIG. 9 is a line-type sectional view, with section lines omitted for ease of understanding, of the embodiment of FIG. 7 taken along the lines 9—9 in FIG. 7.

FIGS. 7–9 illustrate a modified embodiment which is simpler than the arrangement of FIGS. 1–6 and which is suitable for use on small vessels. The arrangement of FIGS. 7–9 not only permits winding of the nets around a drum, but also permits laying out of the nets on a boat, the nets being pulled by the same drum which would ordinarily be used for winding and storing the nets.

The shaking machine of FIGS. 7–9 comprises two end housings 51a,51b, holding a motor driven rotatable drum 52, and a freely rotatable drum 52a if the nets are to be laid in the boat, and a shaking fence 53 in position.

The driving power for the shaking fence 53 is supplied by a motor 54, in this case a hydraulic motor working at low speed and geared down by a gear drive 55 to the proper RPM for the main drive shaft 56. Flywheels 57a,57b, are mounted at the respective ends of drive shaft 56. Shaking arms 58a,58b are eccentrically connected to respective flywheels 57a,57b, and are further coupled to the shaking fence 53 through shaking arms 59a,59b. Flywheels 57a,57b are shaped so that opposite to the mounting of the shaking arms 58a,58b there are additional balance masses to balance the extra weight of the shaking arms 58a,58b for smoother running and for preventing unnecessary vibration.

The drum 52 is driven by a separate hydraulic motor 100 which is mounted direct to the end of the drum 52. This allows good control of the drum speed independent of the shaking frequency. Drum 52 is driven to normally pull and take up the nets, and to wind the nets therearound for storage thereon.

The shaking fence 53 is mounted with bearings in the bearing housings 111a,111b, which are respectively welded to the main housings 51a,51b. The shaking fence 53 comprises end arms 112a,112b, a single wire-rope 113 at the back and a double wire-rope 114 at the front of the fence, similar to the construction shown in FIG. 1. These wire-ropes are preferably coated with a plastic hose to prevent damaging the nets. The double wire-rope 114 lies over a roller on the arm 112b and is fastened and tightened with screw nuts on arm 112a. The arms 58a,58b move the arms 59a,59b back and forth as the drive shaft 56 turns and thereby swings the shaking fence 53.

The drum 52 is provided to wind the nets up on it. However, if the nets are to be laid in the boat a second drum 52a is provided (FIG. 9), which is free rolling in bearings mounted on the back of the main housings 51a,51b. In such a case, the nets are pulled through the machine over and around the upper driven drum 52 and under the free rolling lower drum 52a which then ensures a big enough angle of lap around the driven drum 52. The path of feed of the nets when they are to be laid in the boat, is shown by the line A in FIG. 9. The lower drum 52a may be removed, if the nets are only to be taken up and wound on upper drum 52.

OPERATION OF EMBODIMENT OF FIGS. 7–9

As indicated by the arrowed line A in FIG. 9, the nets are pulled through the double wire-rope 114 (i.e., between the wire-ropes 114), over the wire-rope 113 and are wound over the drum 52 so as to be pulled over by drum 52, and then under the drum 52. The shaking of the catch out of the nets takes place in front of the wire-rope 114 and on the way from it to the upper driven drum 52. The pulling can even be stopped and at the same time the shaking can go on at any desired frequency which can easily be controlled by varying the oil flow through the hydraulic motor 4.

I claim:

1. A shaking machine for shaking fish out of drift nets, comprising:
   at least first and second spaced apart housing members (1a, 1b);
   a shaking fence (4) pivotally mounted to and between said housing members for receiving a drift net to be shaken, said shaking fence being at the forward end of the shaking machine;
   first drive means (7a, 7b; 8a, 8b; 25a, 25b; etc) coupled to said shaking fence (4) for reciprocably pivoting said shaking fence relative to said housing members;
   said shaking fence (4) comprising first and second spaced apart arms (21a, 21b) pivotally mounted to respective housing members (1a, 1b), said spaced apart arms each having forwardly and rearwardly directed ends; at least one elongated member (23) mounted at the forwardly directed ends of said spaced apart arms and extending between said spaced apart arms for receiving a drift net over said at least one elongated member; and at least one elongated member (22) mounted at the rearwardly extending ends of said spaced apart arms and extending between said spaced apart arms for receiving said drift net thereover; said spaced apart arms being reciprocably driven by said first drive means to rock about said pivotal mounting to shake a received drift net;

an upper drum (2) rotatably coupled between said housing members and located above said shaking fence, said upper drum being adapted to receive said drift net thereover from said shaking fence;

a lower drum (3) rotatably coupled between said housing members and located below said upper drum, said lower drum being adapted to receive said drift net thereunder after it passes over said upper drum; and second drive means for rotatably driving said upper and lower drums in different rotational directions to propel a drift net received by said drums from said shaking fence at said forward end, to the rear end of the shaking machine.

2. A shaking machine for shaking fish out of drift nets, comprising:

at least first and second spaced apart housing members (51a, 51b);

a shaking fence (54) pivotally mounted to and between said housing members for receiving a drift net to be shaken, said shaking fence being at the forward end of the shaking machine;

first drive means (57a, 57b; 58a, 58b) coupled to said shaking fence (54) for reciprocably pivoting said shaking fence relative to said housing members;

an upper drum (52) rotatably coupled between said housing members and located above said shaking fence, said upper drum being adapted to receive said drift net thereover from said shaking fence;

a lower drum (52a) rotatably coupled between said housing members and located below said upper drum, said lower drum being freely rotatable and adapted to receive said drift net thereunder after it passes over said upper drum; and second variable speed drive means for rotatably driving said upper drum to propel a drift net received by said upper drum from said shaking fence at said forward end, to the rear end of the shaking machine.

3. A shaking machine for shaking fish out of drift nets, comprising:

at least first and second spaced apart housing members (1a, 1b);

a shaking fence (4) pivotally mounted to and between said housing members for receiving a drift net to be shaken, said shaking fence being at the forward end of the shaking machine;

first drive means (7a, 7b; 8a, 8b; 25a, 25b; etc.) coupled to said shaking fence (4) for reciprocably pivoting said shaking fence relative to said housing members;

said first drive means including a motor (31); a drive shaft (6) extending between said housing members and coupled to be rotatably driven by said motor; respective drive wheels (9) mounted to respective ends of said drive shaft (6) and being rotatably driven thereby; respective drive arms (8a) eccentrically connected to respective ones of said drive wheels (9); and respective further arms (25), each having one end coupled to a respective side end of said shaking fence and each having another end pivotally coupled to a respective drive arm (8a) for being driven back and forth by said respective drive arms (8a) for reciprocably pivoting said shaking fence relative to said housing members;

an upper drum (2) rotatably coupled between said housing members and located above said shaking fence, said upper drum being adapted to receive said drift net thereover from said shaking fence;

a lower drum (3) rotatably coupled between said housing members and located below said upper drum, said lower drum being adapted to receive said drift net thereunder after it passes over said upper drum; and second drive means for rotatably driving said upper and lower drums in different rotational directions to propel a drift net received by said drums from said shaking fence at said forward end, to the rear end of the shaking machine.

4. The shaking machine of claim 1 wherein said first drive means includes:

a motor (31);

a drive shaft (6) coupled to be rotatably driven by said motor;

at least one drive wheel (9) coupled to said drive shaft (6) and being rotatably driven thereby;

at least one drive arm (8a) eccentrically connected to said at least one drive wheel (9); and at least one further arm (25) having one end coupled to at least one of said spaced apart arms (21a, 21b) of said shaking fence and having another end pivotally coupled to said at least one drive arm (8a) for being driven back and forth by said at least one drive arm (8a) for reciprocably pivoting said shaking fence relative to said housing members.

5. The shaking machine of claim 4 wherein said drive shaft (6) extends between said housing members, and said shaking machine further comprising:

respective drive wheels (9) mounted to respective ends of said drive shaft;

respective drive arms (8a, 8b) eccentrically mounted to said drive wheels (9); and respective further arms coupled to respective side ends of said shaking fence and being pivotally coupled to respective drive arms (8a, 8b).

6. The shaking machine of any one of claims 4, 5 or 3 wherein said drive shaft (6) extends through at least one of said drums and is driven independently from said at least one drum.

7. The shaking machine of claim 6 wherein said drive shaft extends fully floating through said lower drum (3).

8. The shaking machine of claim 4 wherein said at least one drive wheel is a flywheel, each flywheel having a balancing mass opposite the eccentric connection of said at least one drive arm to prevent vibration.

9. The shaking machine of any one of claims 1, 4 or 3 wherein said second drive means is independent of said first drive means.

10. The shaking machine of claim 9 wherein said second drive means is a variable speed drive means.

11. The shaking machine of claim 9 wherein said second drive means comprises a hydraulic motor (10), the speed of which is variable by varying the hydraulic fluid flow through said motor to vary the speed of rotation of said upper and lower drums.

12. The shaking machine of claim 9 wherein said second drive means includes a motor and releasable coupling means coupling said motor to said upper drum, said coupling means being releasable to decouple said second drive means from said upper drum to cause said upper drum to stop rotating while said second drive means continues to drive said lower drum to maintain tension on the drift net received on said drums to prevent said drift net from falling back into the sea.

13. The shaking machine of claim 12 wherein said motor of said second drive means comprises a hydraulic motor (10), the speed of which is variable by varying the hydraulic fluid flow through said motor to vary the speed of rotation of said upper and lower drums.

14. The shaking machine of any one of claims 1, 4 or 3 further comprising a rotatable net drum mounted at the rear of the shaking machine for receiving the drift net from said lower drum for winding said drift net thereon.

15. The shaking machine of claim 14 wherein said second drive means includes means for rotatably driving said net drum.

16. The shaking machine of claim 12 further comprising a rotatable net drum mounted at the rear of the shaking machine for receiving the drift net from said lower drum for winding said drift net thereon.

17. The shaking machine of claim 2 wherein said first drive means includes:
a motor;
a drive shaft coupled to be rotatably driven by said motor;
at least one drive wheel coupled to said drive shaft and being rotatably driven thereby;
at least one drive arm eccentrically connected to said at least one drive wheel; and
at least one further arm havng one end coupled to at least one of said spaced apart arms of said shaking fence and having another end pivotally coupled to said at least one drive arm for being driven by said at least one drive arm to reciprocably pivot said shaking fence relative to said housing members.

18. The shaking machine of claim 2 wherein said upper drum receives and winds said net thereon.

19. The shaking machine of claim 1 or 2 wherein said shaking fence comprises a pair of spaced apart elongated members (23) mounted at the forwardly directed ends of said spaced apart arms of said shaking fence and extending between said spaced apart arms of said shaking fence for receiving a drift net between said pair of spaced apart elongated members (23).

* * * * *